United States Patent
Sendai et al.

(10) Patent No.: US 7,539,383 B2
(45) Date of Patent: May 26, 2009

(54) BUFFERED OPTICAL FIBER AND MANUFACTURING METHOD THEREOF

(75) Inventors: Akira Sendai, Tokyo (JP); Kazuhisa Kashihara, Tokyo (JP); Yukio Ishii, Tokyo (JP); Tomoaki Gonohe, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/021,701

(22) Filed: Jan. 29, 2008

(65) Prior Publication Data

US 2008/0131062 A1 Jun. 5, 2008

Related U.S. Application Data

(63) Continuation of application No. PCT/JP2007/061734, filed on Jun. 11, 2007.

(30) Foreign Application Priority Data

Jun. 12, 2006 (JP) .............................. 2006-162424

(51) Int. Cl.
  *G02B 6/02* (2006.01)
  *G02B 6/44* (2006.01)
(52) U.S. Cl. .................... 385/128; 385/100; 385/102; 385/123
(58) Field of Classification Search .......... 385/123–128
See application file for complete search history.

(56) References Cited

U.S. PATENT DOCUMENTS 7,076,139 B1 * 7/2006 Aikawa et al. ............... 385/123
2003/0072546 A1 * 4/2003 Shimada et al. ............. 385/102

FOREIGN PATENT DOCUMENTS

| JP | 2001-116947 | 4/2001 |
| JP | 2004-252388 | 9/2004 |
| JP | 2005-189390 | 7/2005 |
| JP | 2005-200267 | 7/2005 |
| WO | WO 01/40841 A1 | 6/2001 |

* cited by examiner

*Primary Examiner*—Tina M Wong
(74) *Attorney, Agent, or Firm*—Oblon, Spivak, McClelland, Maier & Neustadt, P.C.

(57) ABSTRACT

A buffered optical fiber having an excellent pistoning characteristic compared with a conventional one and a manufacturing method thereof are provided. The buffered optical fiber of the present invention is composed of an optical fiber with a primary coating layer and a secondary coating layer provided on a circumference of a glass optical fiber and a tertiary coating layer having thermoplastic polyester elastomer as the main ingredient provided on a circumference of the optical fiber and is characterized in that an outer diameter of the primary coating layer is 180 to 200 μm, an outer diameter of the secondary coating layer is 350 to 450 μm and the product of a thickness of the secondary coating layer of the optical fiber and a force of pulling out the glass optical fiber from the optical fiber is 720 N/mm·μm or more.

4 Claims, 2 Drawing Sheets

FIG. 1
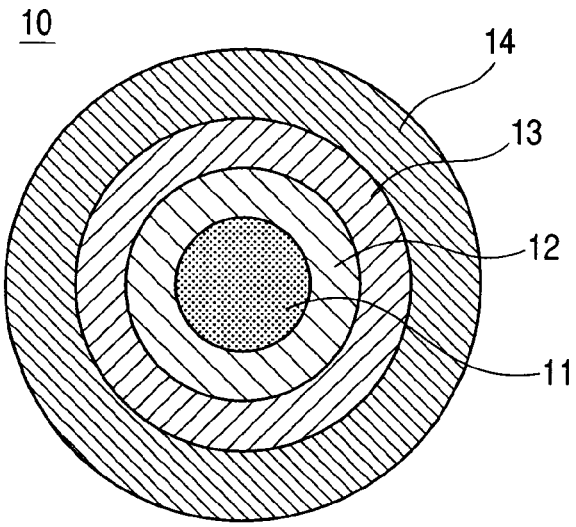
FIG. 2
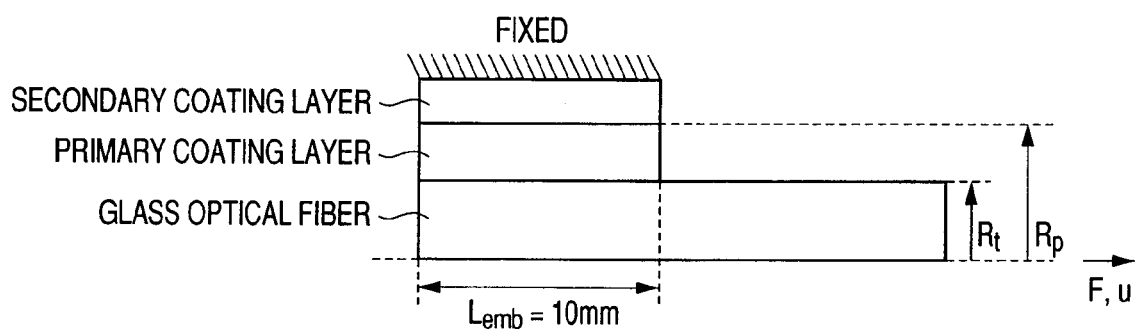
FIG. 3A   FIG. 3B
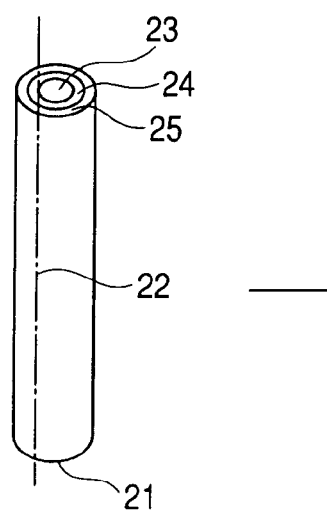 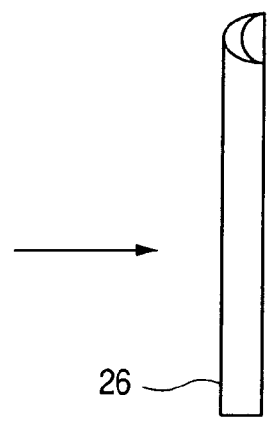

US 7,539,383 B2

BUFFERED OPTICAL FIBER AND MANUFACTURING METHOD THEREOF

TECHNICAL FIELD

The present invention relates to a buffered optical fiber, and more particularly, to a buffered optical fiber with an improved pistoning characteristic and a manufacturing method thereof.

BACKGROUND ART

Conventionally, when manufacturing a buffered optical fiber, at least two coating layers made of silicon-based thermosetting type resin or UV curing resin are applied to the circumference of a glass optical fiber having a diameter of approximately 125 μm to form an optical fiber and this circumference is coated with polyvinyl chloride resin, nylon resin, polyester elastomer resin or the like to form a buffered optical fiber. Though it depends on the use, optical fibers having an outer diameter of approximately 250 μm and approximately 400 μm are used most.

One of important characteristics of a buffered optical fiber is a pistoning characteristic. "Pistoning" means a phenomenon that a glass optical fiber inside the buffered optical fiber protrudes from an end face of coating and when the pistoning characteristic is poor, that is, when the amount of pistoning of the glass optical fiber from the end face of coating is large, there are problems with connections such as occurrence of breaking of the glass optical fiber in the connector. A buffered optical fiber used for a laser module or the like in particular is required to have an extremely small amount of glass pistoning.

As a buffered optical fiber with an improved pistoning characteristic, there are proposals such as one characterized in that Young's modulus of secondary coating is 250 MPa or less and primary stripping force of the optical fiber is 100 g/10 mm to 700 g/10 mm (see Patent Document 1) and another one characterized in that a primary coating layer has a two-layer structure of a buffering layer having low Young's modulus and a protective layer having high Young's modulus, Young's modulus of the buffering layer of the primary coating layer is 0.8 MPa or less, breaking strength is 3.0 MPa or more and glass pulling out force is 0.4 to 1.5 N/mm (see Patent Document 2).

Patent Document 1: Japanese Patent Application Laid-Open No. 2004-252388
Patent Document 2: Japanese Patent Application Laid-Open No. 2005-189390

SUMMARY OF THE INVENTION

However, when the techniques disclosed in Patent Documents 1, 2 are used, it is difficult to sufficiently suppress the pistoning characteristic of the glass fiber without improving the composition of resin (e.g., suppressing the amount of pistoning to 0.5 mm or less) and there is a problem with the aspects of cost and time incurred in manufacturing.

The present invention has been implemented in view of the above described problems and it is an object of the present invention to provide a buffered optical fiber having an improved pistoning characteristic compared to the conventional one. Furthermore, it is another object of the present invention to provide a method of manufacturing a buffered optical fiber capable of easily obtaining a buffered optical fiber with an excellent pistoning characteristic.

The buffered optical fiber of the present invention is composed of an optical fiber with a primary coating layer and a secondary coating layer provided on a circumference of a glass optical fiber and a tertiary coating layer having thermoplastic polyester elastomer as the main ingredient provided on a circumference of the optical fiber, characterized in that an outer diameter of the primary coating layer is 180 to 200 μm, an outer diameter of the secondary coating layer is 350 to 450 μm and the product of a thickness of the secondary coating layer of the optical fiber and a force of pulling out the glass optical fiber from the optical fiber is 720 N/mm·μm or more. Furthermore, the thickness of the secondary coating layer may be configured to be 85 μm or more.

Furthermore, the method of manufacturing a buffered optical fiber of the present invention provides an optical fiber with a primary coating layer and a secondary coating layer on a circumference of a glass optical fiber and a tertiary coating layer having thermoplastic polyester elastomer as the main ingredient provided on a circumference of the optical fiber and is characterized in that the thickness of the secondary coating layer is determined such that an outer diameter of the primary coating layer is 180 to 200 μm, an outer diameter of the secondary coating layer is 350 to 450 μm and the product of the thickness of the secondary coating layer and a force of pulling out the glass optical fiber from the optical fiber is 720 N/mm·μm or more. Furthermore, the thickness of the secondary coating layer may be 85 μm or more.

According to the present invention, by designing the thickness of the secondary coating layer according to the characteristic of resin, it is possible to easily obtain a buffered optical fiber having a satisfactory pistoning characteristic. Therefore, compared to the conventional buffered optical fiber manufactured by improving the composition of resin to improve the pistoning characteristic, the present invention is more advantageous in the aspects of cost and time incurred in manufacturing.

BRIEF DESCRIPTION OF THE DRAWING

FIG. 1 is a traverse cross-sectional view of a buffered optical fiber according to an embodiment of the present invention;

FIG. 2 is a diagram showing an ISM testing method for measuring Young's modulus of a primary coating layer;

FIG. 3 is a diagram showing a process of obtaining a slice of the optical fiber used for a tensile test to measure Young's modulus of a secondary coating layer;

EMBODIMENTS OF THE INVENTION

Figure 4:
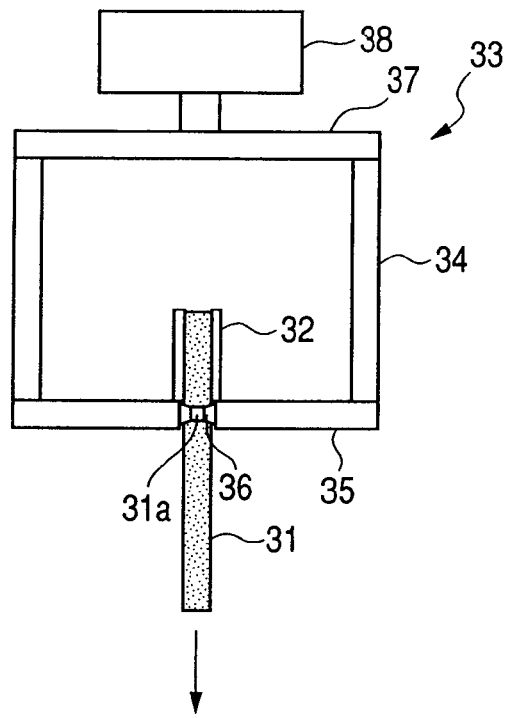
FIG. 4 is a schematic diagram illustrating a method of measuring a glass pulling out force.

FIG. 1 is a cross-sectional view of a buffered optical fiber 10 according to an embodiment of the present invention. In FIG. 1, reference numeral 11 denotes a glass optical fiber, 12 denotes a primary coating layer applied to the circumference thereof and 13 denotes a secondary coating layer applied to the circumference of the primary coating layer 12. Here, the glass optical fiber 11 coated with the primary coating layer 12 and secondary coating layer 13 is called an "optical fiber." Furthermore, a tertiary coating layer 14 having thermoplastic polyester elastomer as the main ingredient is provided on the circumference of the optical fiber and the optical fiber coated with the tertiary coating layer is called an "buffered optical fiber."

UV curing resin or the like is used for both the primary coating layer 12 and secondary coating layer 13 and this buffered optical fiber 10 is actually formed by sequentially applying these layers to the circumference of the drawn glass optical fiber 11. When UV curing resin is used, especially urethane acrylate based UV curing resin is preferably used.

The reason is that this resin has excellent flexibility and a satisfactory buffering function can be expected for a bare glass surface.

However, having excellent flexibility means that it is weak in strength, and therefore the present invention uses a soft primary coating layer 12 with low Young's modulus which directly contacts the glass surface and uses a relatively hard secondary coating layer 13 outside of it with high Young's modulus. The mechanical strength of this optical fiber is secured in this way. Adjustments to Young's modulus for both layers are made by mixing or adding additives or fillers or the like.

On the other hand, the tertiary coating layer 14 is generally formed using thermoplastic resin so that its diameter is approximately 0.9 mm. This thermoplastic resin is not particularly limited, but it is preferable to use thermoplastic polyester elastomer having a tensile elastic modulus of 300 to 700 MPa. This large tensile elastic modulus provides sufficient mechanical strength required for a buffered optical fiber.

Furthermore, to satisfy the optical characteristic as the optical fiber, the outer diameter of the primary coating layer is preferably 180 μm or more and the thickness of the secondary coating layer is preferably 85 μm or more.

EXAMPLES

Example 1

In order to realize more preferable requirements in realizing a good pistoning characteristic in the above described configuration, buffered optical fibers with different parameters were manufactured and Young's modulus, the pulling out force and pistoning characteristic of the respective glass optical fibers were examined.

In manufacturing sample buffered optical fibers, a primary coating layer was formed on the circumference of a glass optical fiber having an outer diameter (diameter) of approximately f125 μm, a secondary coating layer was further formed on the circumference thereof and an optical fiber was thereby manufactured. The outer diameter of the primary coating layer was set to 190 to 200 μm and the outer diameter of the secondary coating layer was set to 350 to 450 μm.

As the resin material of the primary coating layer and secondary coating layer, urethane acrylate based UV curing resin was used for both, and Young's modulus and the glass pulling out force to pull out the glass optical fiber of the primary coating layer and secondary coating layer were adjusted by mixing additives and fillers such as monomer, oligomer, silane coupling agent.

Furthermore, a tertiary coating layer was formed on the circumference of the optical fiber obtained to form a buffered optical fiber. As the resin material of the tertiary coating layer, thermoplastic polyester elastomer having a tensile elastic modulus of 300 MPa was used and the outer diameter (diameter) thereof was set to 0.9 mm.

The results obtained are shown in Table 1.

TABLE 1

| | | 1 | 2 | 3 | 4 | 5 | 6 | 7 |
|---|---|---|---|---|---|---|---|---|
| Diameter of primary coating | μm | 225 | 225 | 225 | 200 | 195 | 190 | 190 |
| Young's modulus of primary coating | Mpa | 0.79 | 0.74 | 0.86 | 0.86 | 0.86 | 0.86 | 0.86 |
| Diameter of secondary coating | μm | 400 | 400 | 400 | 402 | 405 | 385 | 380 |
| Young's modulus of secondary coating | Mpa | 620 | 500 | 800 | 800 | 800 | 800 | 800 |
| Thickness of secondary coating | μm | 87.5 | 87.5 | 87.5 | 101 | 105 | 97.5 | 95 |
| Diameter of buffered optical fiber | μm | 900 | 900 | 900 | 900 | 900 | 900 | 900 |
| Glass pulling out force | N/mm | 14.59 | 5.1 | 7.55 | 11.57 | 11.57 | 11.57 | 10.24 |
| Thickness of secondary coating × glass pulling out force | N/mm* μm | 1277 | 446 | 661 | 1169 | 1215 | 1128 | 973 |
| Amount of pistoning | mm | 0.048 | 2 | 0.53 | 0.082 | 0.067 | 0.082 | 0.15 |

Here, the respective characteristics were measured as follows:

(Young's Modulus)

Young's modulus of the primary coating layer was calculated using an ISM (In Situ Modulus) testing method. More specifically, as shown in FIG. 2, a sample was prepared by leaving only the coating of 10 mm from one end and removing the coating of the rest so as to expose the glass optical fiber and the coated part of the sample was fixed using an adhesive or the like. A force was gradually added so as to pull out the glass optical fiber toward the unfixed end at a temperature of 23° C. and displacement of the glass optical fiber was measured. Assuming that the force added to the unfixed end of the glass optical fiber is F, displacement of the glass optical fiber is u, the outer diameter (radius) of the glass optical fiber is $R_f$, the outer diameter (radius) of the primary coating layer is $R_p$, and the length of the remaining coated part (10 mm in this case) is $L_{emb}$, then the elastic modulus in shear of the primary coating layer $G_p$ can be calculated using the following Expression (1).

[Formula 1]

$$G_p = \frac{F \ln(R_p/R_f)}{2\pi L_{emb} u} \qquad (1)$$

Assuming that Poisson's ratio is ν, Young's modulus is E, then there is a relationship of $E=2(1+\nu) \times G_p$. Here, assuming that there is no volume variation in the primary coating layer by pulling, Poisson's ratio was assumed to be 0.5. Therefore, Young's modulus of the primary coating layer is $3 G_p$.

Young's modulus of the secondary coating layer was calculated as follows. As shown in FIG. 3, a coated part along a slice line 22 (line along the interface between a glass optical fiber 23 and a primary coating layer 24) was obtained from an optical fiber 21 as a slice 26 shown in FIG. 3(b). Reference numeral 25 denotes a secondary coating layer. This slice 26 was subjected to a tensile test under conditions with a temperature of 23° C., pulling speed of 1 mm/min and distance between reference lines of 25 mm and Young's modulus was calculated from the tensile strength when the distance between reference lines was distorted by 2.5%. As the cross-sectional area of the slice 26, a value actually measured using a microscope was used.

(Force of Pulling Out Glass Optical Fiber)

The force of pulling the glass optical fiber was calculated in a condition of the optical fiber using the method in FIG. 4. Sandpaper 32 was adhered to the tip of a sample optical fiber 31 and using this as a stopper, the sample optical fiber 31 was passed through a hole 36 formed in a lower horizontal base 35 of a hanging frame 34 of a glass pulling out tool 33 from above. A notch 31a was formed in the circumference of the optical fiber 31 on the bottom side of the sandpaper 32, and the sample optical fiber 31 in this condition was pull at a pulling speed of 5.0 mm/min. It was then pulled out by an arbitrary length and maximum stress then was measured using a sensor (load cell) 38 provided for an upper horizontal base 37 of the hanging frame 34.

(Pistoning Characteristic)

By exposing the buffered optical fiber to a thermal shock environment, the pistoning characteristic was obtained from the amount of pistoning of the glass optical fiber inside. More specifically, the amount of pistoning was measured after 500 cycles, each cycle consisting of keeping a sample buffered optical fiber of 1.0 m long at −40° C. for 30 minutes and then keeping it at 85° C. for 30 minutes.

Since the allowable amount of pistoning considering the problems with connections and distance between the optical fiber of the light-emitting part or the like is generally considered to be within 0.5 mm, it is clear from Table 1 that it is possible to obtain a good pistoning characteristic by setting the thickness of the secondary coating layer ×the force of pulling out the glass optical fiber to 720 N/mm·μm or more.

Example 2

A buffered optical fiber was prepared as follows and the pistoning characteristic thereof was examined.

In manufacturing the buffered optical fiber of Example 2, a primary coating layer was formed on the circumference of a glass optical fiber having an outer diameter (diameter) of approximately f125 μm, a secondary coating layer was further formed on the circumference thereof and the circumference was then overcoated with the same resin material as that of the secondary coating layer to manufacture an optical fiber. The outer diameter of the primary coating layer was set to 190 to 200 μm, the outer diameter of the secondary coating layer was set to approximately 250 μm and the outer diameter after the overcoating was set to 350 to 450 μm.

As the resin material of the primary coating layer, secondary coating layer and overcoat, urethane acrylate based UV curing resin was used for all, and Young's modulus and glass pulling out force to pull the glass optical fiber of the primary coating layer and secondary coating layer were adjusted by mixing additives and fillers such as monomer, oligomer, silane coupling agent.

Furthermore, a tertiary coating layer was formed on the circumference of the optical fiber obtained to form a buffered optical fiber. As the resin material of the tertiary coating layer, thermoplastic polyester elastomer having a tensile elastic modulus of 300 MPa was used and the outer diameter (diameter) thereof was set to 0.9 mm.

As in the case of Example 1, Young's modulus, the force of pulling out a glass optical fiber and pistoning characteristic were measured. The results will be shown in Table 2. The force of pulling out the glass optical fiber was measured with the optical fiber after the overcoating. In Table 2, the thickness of the secondary coating layer includes the thickness of the overcoat.

TABLE 2

|  | Unit | 8 | 9 | 10 |
|---|---|---|---|---|
| Diameter of primary coating | μm | 195 | 195 | 185 |
| Young's modulus of primary coating | Mpa | 0.86 | 0.86 | 0.74 |
| Diameter of secondary coating (including overcoat) | μm | 400 | 400 | 400 |
| Young's modulus of secondary coating (including overcoat) | Mpa | 900 | 800 | 500 |
| Thickness of secondary coating (including overcoat) | μm | 102.5 | 102.5 | 107.5 |
| Diameter of buffered optical fiber | μm | 900 | 900 | 900 |
| Glass pulling out force | N/mm | 10.29 | 10.29 | 5.1 |
| Thickness of secondary coating × glass pulling out force | N/mm* μm | 1055 | 1055 | 548 |
| Amount of pistoning | mm | 0.069 | 0.096 | 1.5 |

Since the allowable amount of pistoning is generally considered to be within 0.5 mm, it is clear from the results in Table 1 and Table 2 that it is possible to obtain a good pistoning characteristic by setting the thickness of the secondary coating layer ×the force of pulling out the glass optical fiber to 720 N/mm·μm or more.

Figure 5:
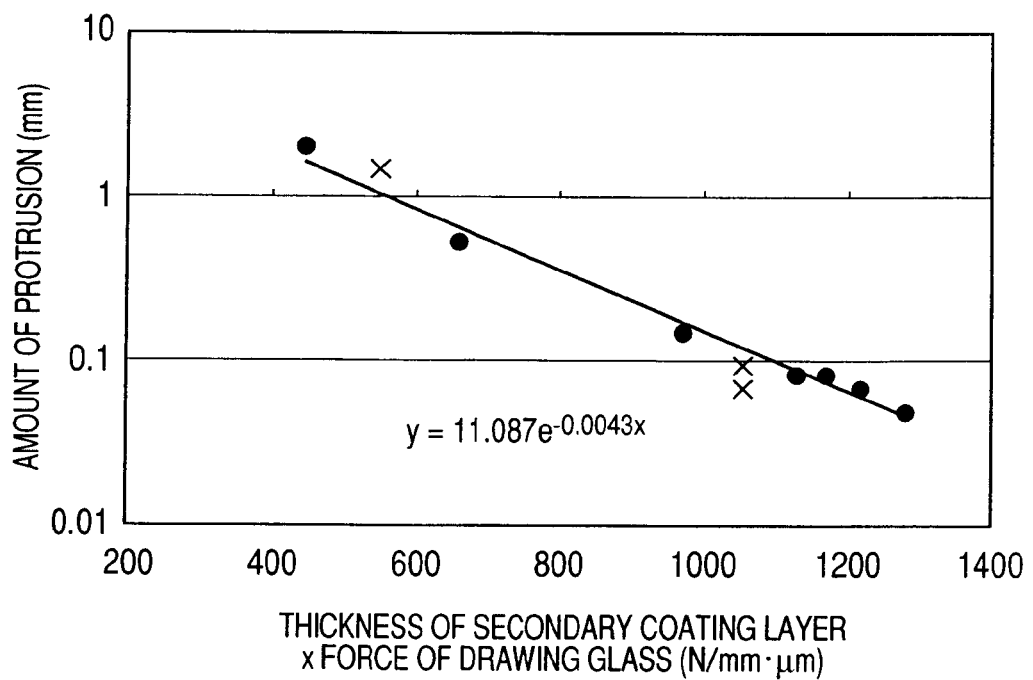
FIG. 5 is a graph showing a relationship between the thickness of the secondary coating layer×the pulling out force and the amount of pistoning.

FIG. 5 is a graph showing a relationship between the thickness of the secondary coating layer×force of pulling out the glass optical fiber and the amount of pistoning obtained in Example 1 and Example 2. "●" denotes the data in Example 1 and "×" denotes the data in Example 2.

It is clear from the result in FIG. 5 that the buffered optical fiber in Example 2 with an overcoat applied to the circumference of the secondary coating layer has a characteristic about the amount of pistoning similar to that of the buffered optical fiber without any overcoat in Example 1. It is also understandable that there is a relationship of $Y=11.087e^{-0.0043X}$ (where, X is the thickness of the secondary coating layer×force of pulling out the glass optical fiber, Y is the amount of pistoning) in both data items.

In the above described examples, the outer diameter (diameter) of the buffered optical fiber was assumed to be 0.9 mm, but the present invention is not limited to this.

The conventional buffered optical fiber has improved the composition of resin for improving the pistoning, incurring cost and time, but using the present invention to cause the thickness of the secondary coating layer to change according to the characteristic of resin makes it possible to easily manufacture a buffered optical fiber having a good pistoning characteristic.

This application claims priority from Japanese Patent Application No. 2006-162424 filed Jun. 12, 2006, which are hereby incorporated by reference herein.

The invention claimed is:

1. A buffered optical fiber comprising:

an optical fiber with a primary coating layer and a secondary coating layer provided on a circumference of a glass optical fiber; and a tertiary coating layer having thermoplastic polyester elastomer as the main ingredient provided on a circumference of the optical fiber, wherein an outer diameter of the primary coating layer is 180 to 200 μm, an outer diameter of the secondary coating layer is 350 to 450 μm and the product of a thickness of the secondary coating layer of the optical fiber and a force of pulling out the glass optical fiber from the optical fiber is 720 N/mm·μm or more.

2. The buffered optical fiber according to claim 1, wherein the thickness of the secondary coating layer is 85 μm or more.

3. A method of manufacturing a buffered optical fiber comprising an optical fiber with a primary coating layer and a secondary coating layer provided on a circumference of a glass optical fiber and a tertiary coating layer having thermoplastic polyester elastomer as the main ingredient provided on a circumference of the optical fiber, wherein the thickness of the secondary coating layer is determined such that an outer diameter of the primary coating layer is 180 to 200 μm, an outer diameter of the secondary coating layer is 350 to 450 μm and the product of the thickness of the secondary coating layer and a force of pulling out the glass optical fiber from the optical fiber is 720 N/mm·μm or more.

4. The method of manufacturing the buffered optical fiber according to claim 3, wherein the thickness of the secondary coating layer is 85 μm or more.

* * * * *